(12) United States Patent
Wu et al.

(10) Patent No.: US 9,363,419 B2
(45) Date of Patent: Jun. 7, 2016

(54) USER PREFERENCES BASED ON CATEGORIES OF IMAGES

(71) Applicant: XEROX CORPORATION, Norwalk, CT (US)

(72) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 440 days.

(21) Appl. No.: 13/891,228

(22) Filed: May 10, 2013

(65) Prior Publication Data

US 2014/0337348 A1    Nov. 13, 2014

(51) Int. Cl.
G06F 17/30     (2006.01)
H04N 1/60     (2006.01)

(52) U.S. Cl.
CPC ........ H04N 1/6013 (2013.01); G06F 17/30247 (2013.01); G06F 17/30256 (2013.01); G06F 17/30265 (2013.01); H04N 1/603 (2013.01)

(58) Field of Classification Search
CPC ....... H04N 1/60; H04N 1/603; H04N 1/6013; H04N 1/6075; H04N 1/6027; H04N 1/6077; G06T 11/001; G06T 2207/1004; G06T 5/00; G06T 2207/20081; G06F 3/14; G06F 17/30244; G06F 17/30256; G06F 17/30265
USPC .......... 707/740, 749, 915; 382/162, 167, 218, 382/254, 274
See application file for complete search history.

(56) References Cited

U.S. PATENT DOCUMENTS

| | | | |
|---|---|---|---|
| 5,300,974 A | 4/1994 | Stephenson, III | |
| 5,495,539 A | 2/1996 | Sieverding | |
| 6,032,004 A | 2/2000 | Mirabella, Jr. et al. | |
| 7,023,448 B1 | 4/2006 | Danciu | |
| 7,082,227 B1 * | 7/2006 | Baum et al. | 382/311 |
| 7,187,799 B2 | 3/2007 | Braun | |
| 7,190,831 B2 | 3/2007 | Braun | |
| 7,196,735 B2 | 3/2007 | Braun | |
| 7,328,116 B2 | 2/2008 | Bala et al. | |
| 7,606,412 B2 * | 10/2009 | Huh et al. | 382/162 |
| 7,784,031 B1 * | 8/2010 | Borg | G06F 9/44505 713/1 |
| 7,796,296 B2 | 9/2010 | Martinez et al. | |

(Continued)

OTHER PUBLICATIONS

Wu et al., U.S. Appl. No. 13/655,516, filed Oct. 19, 2012.

(Continued)

*Primary Examiner* — Dangelino Gortayo
(74) *Attorney, Agent, or Firm* — Gibb & Riley, LLC

(57) ABSTRACT

Methods and systems receive an image-processing request relating to user images from a user. Such methods and systems classify the user images into user-request image-element categories. Such methods and systems also retrieve previously stored user-specific preferences for the user-request image-element categories from a computer storage, when the previously stored user-specific preferences for the user-request image-element categories are maintained in the computer storage. However, when the previously stored user-specific preferences for the user-request image-element categories are not maintained in (are absent from) the computer storage, such methods and systems obtain additional user-specific preferences for the user-request image-element categories. Such methods and systems can then processes the image-processing request by altering renditions of the user images according to the previously stored user-specific preferences and/or the additional user-specific preferences.

16 Claims, 9 Drawing Sheets

(56) References Cited

U.S. PATENT DOCUMENTS

| | | |
|---|---|---|
| 7,835,576 B2 | 11/2010 | Kang et al. |
| 8,154,778 B2* | 4/2012 | Patton et al. ............. 358/518 |
| 8,526,728 B2* | 9/2013 | Kang et al. ............... 382/167 |
| 9,002,109 B2* | 4/2015 | Krishnaswamy et al. .... 382/167 |
| 2004/0013298 A1 | 1/2004 | Choe et al. |
| 2005/0219561 A1* | 10/2005 | Haikin ............ H04N 1/6013 358/1.9 |
| 2008/0007749 A1 | 1/2008 | Woolfe |
| 2010/0085377 A1 | 4/2010 | Woolfe |
| 2013/0300761 A1* | 11/2013 | Ahmed ..................... 345/595 |

OTHER PUBLICATIONS

Collaborative filtering, http://en.wikipedia.org/wiki/Collaborative_filtering, Apr. 24, 2013.

\* cited by examiner

| Attribute | Customers | | |
|---|---|---|---|
| | Subj #1 | Subj #2 | Subj #2 ... |
| human portraits | $\Delta L_{11}, \Delta a_{11}, \Delta b_{11}$ | $\Delta L_{21}, \Delta a_{21}, \Delta b_{21}$ | $\Delta L_{31}, \Delta a_{31}, \Delta b_{31}$ |
| sky | $\Delta L_{12}, \Delta a_{12}, \Delta b_{12}$ | $\Delta L_{22}, \Delta a_{22}, \Delta b_{22}$ | $\Delta L_{32}, \Delta a_{32}, \Delta b_{32}$ |
| grass | $\Delta L_{13}, \Delta a_{13}, \Delta b_{13}$ | $\Delta L_{23}, \Delta a_{23}, \Delta b_{23}$ | $\Delta L_{33}, \Delta a_{33}, \Delta b_{33}$ |
| foliage | $\Delta L_{14}, \Delta a_{14}, \Delta b_{14}$ | $\Delta L_{24}, \Delta a_{24}, \Delta b_{24}$ | $\Delta L_{34}, \Delta a_{34}, \Delta b_{34}$ |
| ocean scene | $\Delta L_{15}, \Delta a_{15}, \Delta b_{15}$ | $\Delta L_{25}, \Delta a_{25}, \Delta b_{25}$ | $\Delta L_{35}, \Delta a_{35}, \Delta b_{35}$ |
| river scene | $\Delta L_{16}, \Delta a_{16}, \Delta b_{16}$ | $\Delta L_{26}, \Delta a_{26}, \Delta b_{26}$ | $\Delta L_{36}, \Delta a_{36}, \Delta b_{36}$ |

FIG. 10

| Customers ||||
|---|---|---|---|
| Subj #1 | Subj #2 | Subj #2 | ... |
| color cluster: $\mu L_{11} \pm \sigma L_{11}, \mu a_{11} \pm \sigma a_{11}, \mu b_{11} \pm \sigma b_{11}$<br>user adjustment: $\Delta L_{11}, \Delta a_{11}, \Delta b_{11}$ | color cluster: $\mu L_{21} \pm \sigma L_{21}, \mu a_{21} \pm \sigma a_{21}, \mu b_{21} \pm \sigma b_{21}$<br>user adjustment: $\Delta L_{21}, \Delta a_{21}, \Delta b_{21}$ | color cluster: $\mu L_{31} \pm \sigma L_{31}, \mu a_{31} \pm \sigma a_{31}, \mu b_{31} \pm \sigma b_{31}$<br>user adjustment: $\Delta L_{31}, \Delta a_{31}, \Delta b_{31}$ | |
| color cluster: $\mu L_{12} \pm \sigma L_{12}, \mu a_{12} \pm \sigma a_{12}, \mu b_{12} \pm \sigma b_{12}$<br>user adjustment: $\Delta L_{12}, \Delta a_{12}, \Delta b_{12}$ | color cluster: $\mu L_{22} \pm \sigma L_{22}, \mu a_{22} \pm \sigma a_{22}, \mu b_{22} \pm \sigma b_{22}$<br>user adjustment: $\Delta L_{22}, \Delta a_{22}, \Delta b_{22}$ | color cluster: $\mu L_{32} \pm \sigma L_{32}, \mu a_{32} \pm \sigma a_{32}, \mu b_{32} \pm \sigma b_{32}$<br>user adjustment: $\Delta L_{32}, \Delta a_{32}, \Delta b_{32}$ | |
| color cluster: $\mu L_{13} \pm \sigma L_{13}, \mu a_{13} \pm \sigma a_{13}, \mu b_{13} \pm \sigma b_{13}$<br>user adjustment: $\Delta L_{13}, \Delta a_{13}, \Delta b_{13}$ | color cluster: $\mu L_{23} \pm \sigma L_{23}, \mu a_{23} \pm \sigma a_{23}, \mu b_{23} \pm \sigma b_{23}$<br>user adjustment: $\Delta L_{23}, \Delta a_{23}, \Delta b_{23}$ | color cluster: $\mu L_{33} \pm \sigma L_{33}, \mu a_{33} \pm \sigma a_{33}, \mu b_{33} \pm \sigma b_{33}$<br>user adjustment: $\Delta L_{33}, \Delta a_{33}, \Delta b_{33}$ | |
| color cluster: $\mu L_{14} \pm \sigma L_{14}, \mu a_{14} \pm \sigma a_{14}, \mu b_{14} \pm \sigma b_{14}$<br>user adjustment: $\Delta L_{14}, \Delta a_{14}, \Delta b_{14}$ | color cluster: $\mu L_{24} \pm \sigma L_{24}, \mu a_{24} \pm \sigma a_{24}, \mu b_{24} \pm \sigma b_{24}$<br>user adjustment: $\Delta L_{24}, \Delta a_{24}, \Delta b_{24}$ | color cluster: $\mu L_{34} \pm \sigma L_{34}, \mu a_{34} \pm \sigma a_{34}, \mu b_{34} \pm \sigma b_{34}$<br>user adjustment: $\Delta L_{34}, \Delta a_{34}, \Delta b_{34}$ | |
| color cluster: $\mu L_{15} \pm \sigma L_{15}, \mu a_{15} \pm \sigma a_{15}, \mu b_{15} \pm \sigma b_{15}$<br>user adjustment: $\Delta L_{15}, \Delta a_{15}, \Delta b_{15}$ | | color cluster: $\mu L_{35} \pm \sigma L_{35}, \mu a_{35} \pm \sigma a_{35}, \mu b_{35} \pm \sigma b_{35}$<br>user adjustment: $\Delta L_{35}, \Delta a_{35}, \Delta b_{35}$ | |
| color cluster: $\mu L_{16} \pm \sigma L_{16}, \mu a_{16} \pm \sigma a_{16}, \mu b_{16} \pm \sigma b_{16}$<br>user adjustment: $\Delta L_{16}, \Delta a_{16}, \Delta b_{16}$ | | color cluster: $\mu L_{36} \pm \sigma L_{36}, \mu a_{36} \pm \sigma a_{36}, \mu b_{36} \pm \sigma b_{36}$<br>user adjustment: $\Delta L_{36}, \Delta a_{36}, \Delta b_{36}$ | |

FIG. 11

USER PREFERENCES BASED ON CATEGORIES OF IMAGES

BACKGROUND

Systems and methods herein generally relate to obtaining image rendition preferences from users and more particularly to methods and systems that substantially limit the number of images needed to be reviewed by the user and that retrieve previously stored user preferences based on classes of images.

Digital printing provides the ability to have short-run jobs at much lower page-cost than traditional analog (e.g., lithographic) printing. This enables a significant market segment called one-to-one (1-1) printing for highly personalized print jobs. Examples are photo books and book on-demand. For photo books, color rendition is known to be a factor for customer satisfaction. Current practices address color rendition via "opinion of majority" or "expert opinion." However, color rendition is highly subjective, and individual customers have their own preferences. For critical jobs, artists may work with complicated workflows that use very precise soft-proofing or hard-proofing techniques. However, non-professional photo book customers are generally simply provided an average "best" color rendition according to the opinion of the majority of users.

Thus, preference of color rendition is very subjective. Common approaches either ignore individual color preference by using a rendition which captures opinion of the majority only, or through user-performed extensive/complicated soft-proofing for the entire document. The former does not address individual preferences, while the later is time-consuming and can be frustrating. Neither approach is suitable for typical consumer of 1-1 printing applications such as ordering photo books or ordering prints of family pictures. Here 1-1 printing refers to print jobs with contents that are specific for a single user. This is to contrast with the kind of print jobs wherein many users receive copies of same or similar contents.

SUMMARY

Exemplary methods herein receive an image-processing request relating to user images from a user into a graphic user interface of a computerized device. Such methods classify the user images into user-request image-element categories using a processor of the computerized device. If the previously stored user-specific preferences for the user-request image-element categories are maintained in the non-volatile computer storage medium, such methods retrieve the previously stored user-specific preferences for the user-request image-element categories from a non-volatile computer storage medium using the processor. However, when the previously stored user-specific preferences for the user-request image-element categories are not in (are absent from) the non-volatile computer storage medium, such methods perform a process to obtain additional user-specific preferences for the user-request image-element categories, using the graphic user interface.

The previously stored user-specific preferences may comprise those previously stored preference data, input by the user, or those previously stored preference data, input by a plurality of different users. Such previously stored user-specific preferences of different users can be classified into user-type classifications, and the methods herein can match the user into one or more of such user-type classifications using, for example, collaborative filtering or other processes that identify similarities of taste between the user and the classifications of the different users. In such situations, the methods only retrieve the previously stored user-specific preferences that are within the user-type classification(s) to which the user has been matched.

The process of obtaining additional user-specific preferences begins by selecting sample images that correspond to the user-request image-element categories. Each of the sample images represents a different image-element category. This process presents, to the user, different versions of the sample images through the graphic user interface, requests the user to select preferred versions of the sample images from the different versions of the sample images (using the graphic user interface) and receives, in response, a user selection of preferred images, through the graphic user interface. The process then determines such additional user-specific preferences for each different image-element category based on the user selection of the preferred images using the processor. The additional user-specific preferences can be different for different users that select the preferred images through the graphic user interface. The process then stores the additional user-specific preferences in the non-volatile computer storage medium to add to the previously stored user-specific preferences.

Such methods can then processes the image-processing request using the processor by altering renditions of the user images according to the previously stored user-specific preferences and/or the additional user-specific preferences.

Exemplary systems herein comprise a processor, a non-volatile computer storage medium operatively connected to the processor, a graphic user interface operatively connected to the processor, etc. The graphic user interface receives an image-processing request relating to user images from a user, and the processor classifies the user images into user-request image-element categories. The processor then retrieves previously stored user-specific preferences for the user-request image-element categories from the non-volatile computer storage medium, when the previously stored user-specific preferences for the user-request image-element categories are maintained in the non-volatile computer storage medium. The graphic user interface performs an obtaining process to obtain additional user-specific preferences for the user-request image-element categories, if the previously stored user-specific preferences for the user-request image-element categories are absent from the non-volatile computer storage medium. The processor processes the image-processing request by altering renditions of the user images according to at least one of the previously stored user-specific preferences and the additional user-specific preferences.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 10 is an attribute-driven and discrete lookup table; and

FIG. 11 is a continuous form link table.

DETAILED DESCRIPTION

As mentioned above, color rendition is highly subjective, and while professionals may work with complicated, elaborate soft-proofing or hard-proofing techniques, non-professional customers are generally provided with only an average "best" color rendition that matches the opinion of the majority of users (but which may not comply with a specific individual's color preferences). Therefore, the systems and methods herein provide a simple but effective indirect soft-proof method to capture individual customer's preference and thus improve customer satisfaction.

In particular, systems and methods herein provide a color rendering recommender system and method for 1-1 printing applications such as on-line photo book ordering. The systems and methods herein act as a pre-process/pre-screen system, which can in many cases significantly reduce the effort, required of the customer. The systems and methods herein use previously stored preference data, input by the given customer, or by similar customers, to recommend color rendition preference data, instead of requiring customers to perform redundant color preference surveys each time they make an image processing request. The systems and methods herein provide a color rendering recommender system for 1-1 printing to capture individual customer's preference with minimal need for customer soft-proofing.

Thus, the systems and methods herein improve customer satisfaction by improving efficiency and requiring customers to put in less effort. In particular, the systems and methods herein use existing data on color rendition preference of a customer or existing data on color rendition preference of similar customers to recommend preferred color rendition of customers for current or future print jobs. Further, the systems and methods herein determine color rendition techniques such as preferred memory color and skin tone rendition, and can provide a natural language color editor to obtain such color preferences.

Figure 1:
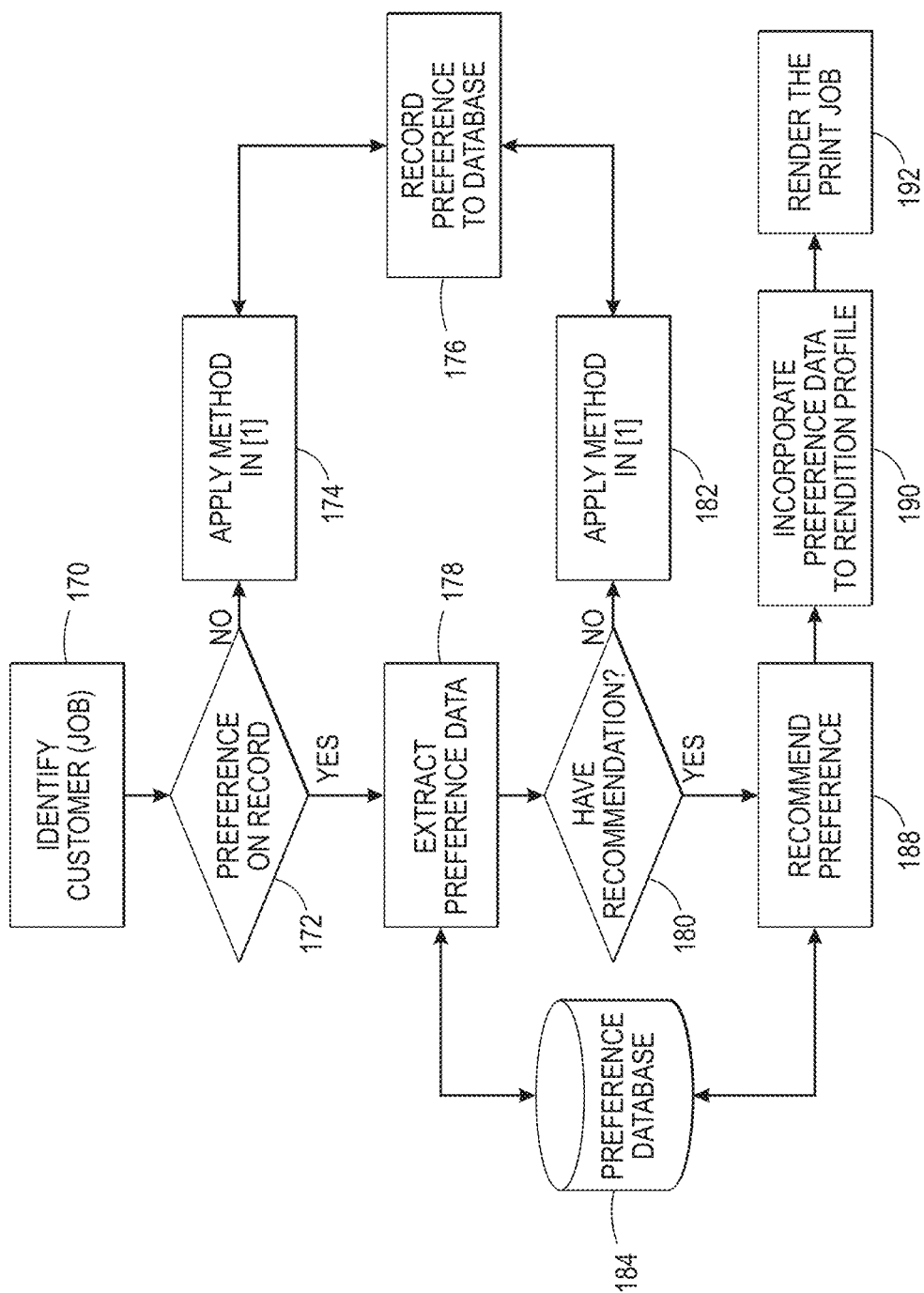
FIG. 1 is a flow diagram illustrating features of various systems and methods herein.

FIG. 1 is an example flowchart illustrating aspects of systems and methods herein. As shown in FIG. 1, processing in item 170 identifies the customer (e.g., via IP address, account login, etc.) and optionally identifies the attributes of the submitted print job (e.g., beach scene, portrait, etc.) to find the category in which the images in the submitted print job can be classified (which are sometimes referred to herein as "user-request image-element categories").

Then, in item 172, the systems and methods herein check whether the preferences for such image-element categories of the customer are on record. If there are no stored user preferences, in item 174 the systems and methods herein apply the method shown in FIG. 6 (which, as discussed below, avoids having the user proof all images by acquiring categorical preferences using sample color images). The systems and methods herein then store the additional user-specific preferences in the non-volatile computer storage medium (preference database 184) to add to the previously stored user-specific preferences, as shown by item 176.

If the preferences for such image-element categories of the customer are on record in the preference database 184, the systems and methods herein extract color rendition (CR) preference parameters for such image-element categories of the customer in item 178. Next, in item 180, the methods and systems herein check whether there are sufficient color rendition preference parameters for such image-element categories of the customer on record to make automated recommendation for the customer job. If not, the systems and methods herein again apply the method shown in FIG. 6 (discussed below) in item 182 and subsequently record the preferences for future use in a database (item 176).

If a recommendation can be made, in item 188 the systems and methods herein recommend CR preference parameters based on at least one of the existing image-element categories of the customer, the attributes of current job, and the preference data of others with similar preferences. The recommender process and the predicted individual preference in item 188 can be learned and modeled via collaborative filtering, or other similar processes known in machine learning. In item 190 the systems and methods herein incorporate recommended preference data into color rendition profiles, and in item 192 the systems and methods herein render the custom print job with the resulting profiles. The methods and systems herein avoid requiring the customer to perform redundant preference surveys.

In more detail, in item 170, the customer can be identified by, for example, account login, Internet Protocol (IP) address of the computer used to submit the print job, or manual inputs from the individual. Optionally and additionally, the systems and methods herein identify the type of print jobs for later use in item 170. For example, the current print job may only require the use of subjective CR preferences for skin tone and sky, but may not need CR preferences for grass and beach. Knowing this can potentially shorten the subjective survey in later steps 174 and 182. If there is no record of CR preference of the current customer, then the systems and methods herein will simply apply the method shown in FIG. 6 below, without any additional involvement. The systems and methods herein record the preference extracted in items 174 and 182 to the preference database 184 for future use.

Figure 6:
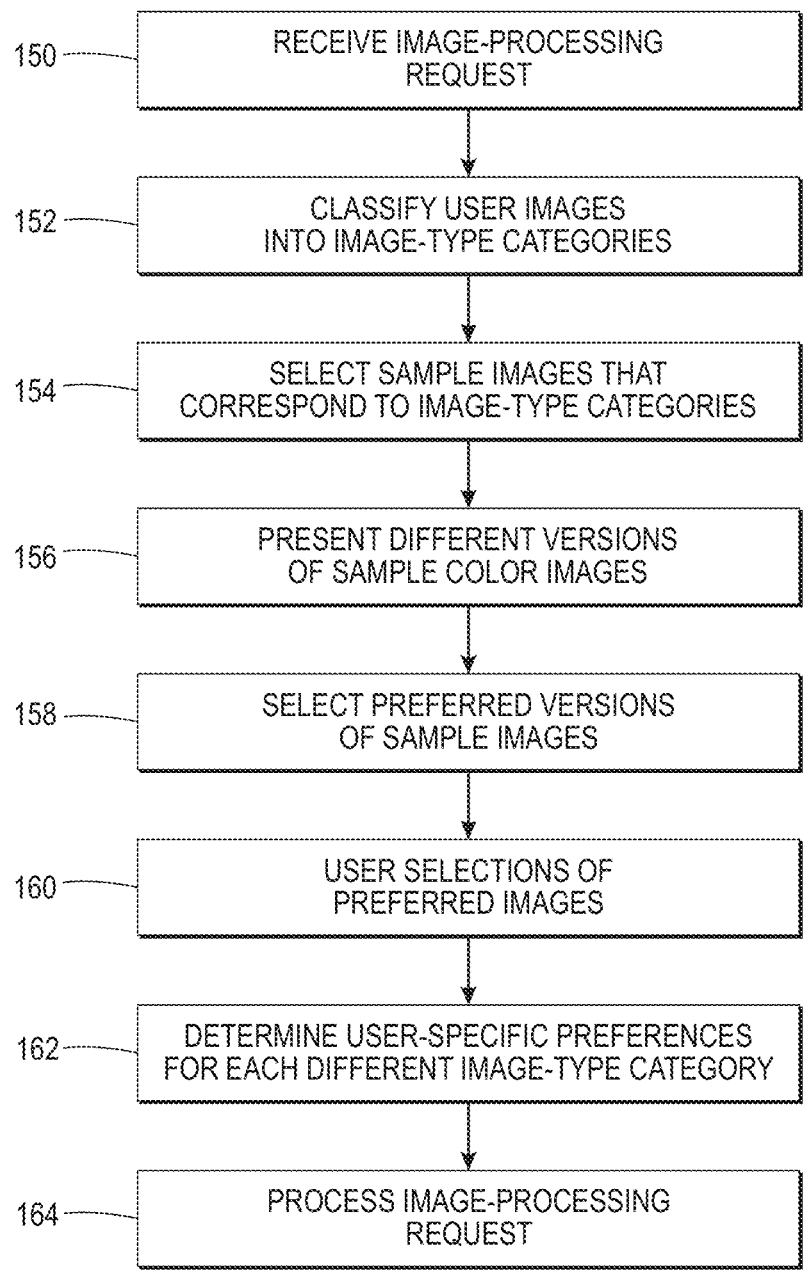
FIG. 6 is a flow diagram illustrating features of various systems and methods herein.

As shown in FIG. 6 discussed below, subjective CR preference can be extracted from a survey on a set of representative images (referred to as probe images). The characteristics that are relevant to subjective CR preference, contained in these representative images, are often called attributes: e.g., human portraits, sky, grass, foliage, ocean and river scenes, etc. Thus a natural form of this preference database for each customer is a table such as that shown in FIG. 10 (attribute-driven and discrete lookup table).

This aligns better with how humans perceive color images, and with the survey methodologies used in the processing shown in FIG. 6 discussed below, which categorizes these attributes of each representative image and records the preferences accordingly. On the other hand, an alternative form (non attribute-driven, non discrete) of database shown in FIG. 11 (a continuous form link table (rational table) shown below) can be used, where representative color clusters of representative images and the corresponding preferred rendering of them are stored for each subject.

One advantage of the database shown in FIG. 11 is that it is in a continuous scale, and thus it is easier to derive numerical preference recommendations, and to find customers with similar preference tastes more accurately. The database shown in FIG. 11 may require further analyses such as clustering and classification in order to make the linkage to perception attributes, whose CR preferences are collected in the survey.

For an attribute-driven database (e.g., FIG. 10) since there are a finite and fixed number of applicable image categories, the table can be stored in a simple discrete look-up table (LUT). Some entries can be empty if a user did not participate in surveys on some categories. For a non attribute-driven database (e.g., FIG. 11) each user may have a very different number of entries depending on how many surveys the user participated in, and on how many sample images were viewed by the user in such surveys. It is thus more appropriate to store the non attribute-driven database in a link list form rather than a flat LUT that has many empty entries.

In one example, the name/ID of all users can be stored, and then under each user entry all color clusters and corresponding preferred user adjustments can be stored under the user-link. Even though FIGS. 10 and 11 show each column representing the survey result of a user, it can also represent the survey result of a user at one given time. Especially in the latter case, it is beneficial to also keep the time stamp of the survey for future analysis (CR preference trend etc.).

As mentioned above, in item 188, the systems and methods herein can recommend a preference. In item 188, systems and methods herein can utilize a recommender system to provide CR preference recommendation based on the existing customer CR preferences stored in the database (FIGS. 10 and 11). In one example (E1), the customer whose data is used is the same customer who submits the current job. In this example, the CR preference data is from the result of his/her previous survey inputs. In such an example, the systems and methods herein limit recommendation to those based solely on the same user's previous preference. This requires the simplest algorithm for developing a recommender system, since it only needs a simple table look-up and additionally some interpolations or temporal prediction (using past data to predict future trends) from the database. The advantage here is simplicity; however, this requires each user to have performed the survey for each image category of his/her job at least once previously, and preferably more than once.

In another example (E2), the customers whose data are used are a plurality of customers, who are identified as having similar tastes as the current customer. The CR preference data used would thus be limited to the results of their previous survey inputs. In this example, two steps are applied: first identify groups with similar taste, and then derive CR preference based on the relative position of current users to this group. The simplest implementation of this example is to still require that data for the current user exists in the database, while allowing derivation of the CR preference from the inputs of the identified group. This increases the robustness of the resulting recommendation. A more efficient implementation relaxes this requirement and utilizes a simpler survey (e.g., instead of requiring the survey to include at least N probe images per image category, requiring only M<<N probe images per image category) for the purpose of identifying the current user's taste. Then a more thorough CR preference recommendation can be derived from the group. An example for this recommender system is discussed below.

In yet another example (E3), the customers whose data are used consist of all or almost all (e.g., outlier removal against current user) users who have performed at least one preference survey in the past on at least one image category (not necessarily all categories). The CR preference data used is thus all the results of all previous survey inputs. This is the most general example, where the database is fully utilized for each user in the database. A well-known process for such a recommender system is called collaborative filtering. This example can be highly efficient (requiring least actual survey effort from current user) but can require a large database and may use proper noise and outlier rejection in the data analysis.

One illustration can assume that the CR preference is stored in the attribute-driven form shown in FIG. 10, and that there are 6 image categories of interest, and there is incomplete data for some or all customers (i.e., each customer may not have completed all preference surveys for all image categories). The processes discussed below are still applicable to cases where the database is in a continuous form shown in FIG. 11, but some pre-processing such as clustering may be required for E1 and E2.

A recommendation for example E2 is as follows. Consider a user who had participated in CR preference surveys for all image-categories but one (e.g., river scene) and had specified his preferred color adjustments $\Delta L_{ij}, \Delta a_{ij}, \Delta b_{ij}$ (column i in FIG. 10) from the survey. In this example the 6th entry corresponding to river scene for this user is empty, and the goal of the recommender module is to suggest appropriate values for this user. CR preference features, denoted $f_i$, of user i can be defined as:

$$f_i = [\Delta L_{i1}, \Delta a_{i1}, \Delta b_{i1}, \Delta L_{i2}, \Delta a_{i2}, \Delta b_{i2}, \ldots, \Delta L_{i3}, \Delta a_{i3}, \Delta b_{i3}]^T.$$

Then, one simple way to identify a user with similar taste is to calculate the distances between $f_i$ and $f_j$, $j \neq i$ and consider all users j with distance less than a pre-determined threshold as users that have similar taste as user i. Another preferred similarity measure is to use cross-correlation coefficient ($\gamma_{ij}$) between $f_i$ and $f_j$, $j \neq i$. Here the value of $\gamma_{ij}$ will be between $-1$ and 1, and the two users are similar if the value is high (e.g., $\gamma_{ij} \geq 0.9$). This is superior over a simple distance measure since it is normalized by the feature vector length. Thus, it can identify two users with similar relative CR preference but with different preferred magnitudes of changes. Once this sub-group of user j's, who have similar taste as user i, are identified, the recommended CR preference for user i on river scene, i.e. $\Delta L_{i6}, \Delta a_{i6}, \Delta b_{i6}$, can be estimated from $\gamma_{ij}$ and $\Delta L_{j6}, \Delta a_{j6}, \Delta b_{j6}$ of the above sub-group user j's. A simple example approach is to use the $\gamma_{ij}$-weighted average of $\Delta L_{j6}, \Delta a_{j6}, \Delta b_{j6}$. Other complex multi-dimensional interpolation methods can be used here as well.

A recommendation for example E3 is as follows. As discussed above, example E3 is a most general case, which fully utilizes the database (except outliers) and can be solved via collaborative filtering. Here, the systems and methods first give a brief review of how collaborative filtering can be used for recommending movies to illustrate simple intuition and then discuss details for this work specifically. The underlying assumption for collaborative filtering to work in this context is that users can be grouped by "taste" type and these tastes are driven by some unknown attributes (e.g., outdoor image contents, indoor image contents, etc.). Considering a simple example of 3 images partially rated by 4 users on a 1-5 scale shown in Table 2a, the goal of a recommender system here is to predict the rating of those missing entries. With this example that has very limited data, it is reasonable to predict that User3 will rate Image1 as 4 and User4 will rate Image3 as 3 since User1 has rated Image1 and Image3 the same and User2 has rated Image1 and Image3 the same as well even though they have completely opposite tastes. That is, from the very limited data available in Table 2a, the only pattern observed suggests that all users may give Image1 and Image3 the same rating regardless of their taste. This may be because Image 1 and Image 3 are very similar. For a more mathematical explanation based on prior art on recommender system, let us assume that Image1 and Image3 are outdoor images while Image2 is an indoor image. From that one can see that User1 is extremely in favor of outdoor images and extremely dislikes indoor images, User2 is the opposite of User1, User3 likes indoor images and dislikes outdoor images, and User4 is ok with indoor images and dislikes outdoor images. For simplicity, it is assumed that there are only two driving attributes of image taste (indoor and outdoor images). Given the "strength" of indoor and outdoor images j ($x_{1j}, x_{2j}$), an example collaborative filtering method (there exist many [2]) models the rating of user i for images j as $w_{i1}x_{1j}+w_{i2}x_{2j}w_{i0}+w_{i1}x_{1j}+w_{i2}x_{2j}$. Here the weights w's are user dependent but not image dependent, while the strengths of attributes x's are image-dependent not user-dependent. With that, one can solve both w's and x's for all users and all images via an iterative linear-least-square solution (given x's solve w's and then given w's solve x's, . . . ). With that, one can find a feasible solution where x's for Image1~3 are (1,0),(0,1),(1,0), while the user taste (w's) for User1~4 are (5,0),(0,5),(4,2),(3,2), respectively. These results are listed in Table 2b (in blue text). One can then use that to predict User3's rating on Image1 as 4 and User4's rating on Image3 as 3 (Table 2b, below). In this simple example, there is a unique and optimal solution for w's and x's. In practice, there are often more than two driven attributes (5~10) for images and user behavior can be noisy. This is why a large dataset (more users rated on many images) and a least squares solution are often sought after for such recommender systems. Table 2a relating to user image rating and Table 2b recommendation and model parameters derived from simple linear collaborative filtering algorithm are shown below.

TABLE 2a

|  | User1 | User2 | User3 | User4 |
|---|---|---|---|---|
| Image1 | 5 | 1 | ? | 3 |
| Image2 | 1 | 5 | 2 | 2 |
| Image3 | 5 | 1 | 4 | ? |

TABLE 2b

|  | User1 (5, 0) | User2 (0, 5) | User3 (4, 2) | User4 (3, 2) | $x_{1j}$ | $x_{2j}$ |
|---|---|---|---|---|---|---|
| Image1 | 5 | 1 | 4 | 3 | 1 | 0 |
| Image2 | 1 | 5 | 2 | 2 | 0 | 1 |
| Image3 | 5 | 1 | 4 | 3 | 1 | 0 |

When applying collaborative filtering for CR preference recommendation, the recommendation is very straight-forward because FIG. 10 is similar to concatenating three of Table 2b (one for ΔL, one for Δa, and one for Δb). Furthermore, there are only limited rows (# of image-categories of interest/relevance), e.g. 6. One remaining issue is selection of a set of attributes that drive user taste (CR preference) that should be specified for all rows. Such a set of attributes should be small enough to be manageable, yet comprehensively cover all the important CR attributes. For CR preference, a set of 5~10 attributes would be sufficient.

Figure 2:
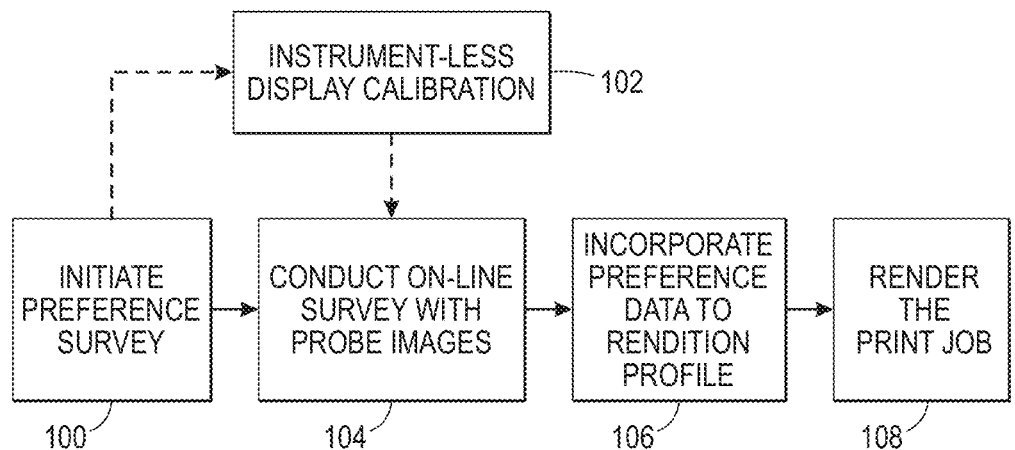
FIG. 2 is a flow diagram illustrating features of various systems and methods herein.

As mentioned above, another feature of the systems and methods herein is to provide an indirect subjective soft-proof system and method for 1-1 printing applications such as typical photo printing (e.g., 3×5, 4×6 etc.), on-line photo book ordering, etc. FIG. 2 depicts an example system flowchart for such systems and methods herein. In item 100, the user is prompted to participate in a simple preference survey. A customer display color characterization is performed in item 102. For example, in item 102, the customer display can be assumed to be in the standard sRGB space. Optionally, the customer can be prompted to perform a simple instrumentless display calibration procedure in item 102. In situations where a customer is capable of performing a better display calibration using a color measurement instrument, item 102 can be replaced with such a procedure. While some conventional calibration processes are mentioned here, those ordinarily skilled in the art would understand that any calibration process (whether currently known or developed in the future) could be used with systems and methods herein.

In item 104, appropriate probe images with various color renditions (CR) are used for conducting a subjective preference survey in order to extract customer CR preference parameters. Thus, during the survey in item 104, the systems and methods herein present, to the user, different color versions of one or more sample color images (probe images) through the graphic user interface, and request the user to select preferred color versions of the sample color images.

In item 106 extracted CR preference parameters are incorporated into the creation of a job-specific color rendition profile to implement subjective preferences using technologies such as preferred memory color and skin tone rendition, and can use a natural language color editor. Finally, in item 108, this custom job can be printed with the resulting profile. With the systems and methods herein, it is possible to improve customer satisfaction by rendering the customer's job with color rendition that aligns better with their individual preferences, rather than the average opinion of a given population.

The term indirect comes from the fact that the systems and methods herein may not always use all customer images directly to obtain customer preferences, since typically there could be too many customer images. With a small but appropriate set of sample or probe images, the systems and methods herein can get the needed information of subjective preference without a time-consuming soft-proofing of all customer images.

As mentioned above, the systems and methods herein initiate a simple preference survey in item 100. In this step, the systems and methods herein prompt the customer to participate in a simple preference survey to improve the quality of their submitted job. Considering the potential benefit to the customer, and the amount of time needed to complete the survey, a motivation may be provided in step 100. In one example, a small incentive may be offered for participation. In another example, a preferred survey method can be chosen by the customer (e.g., multiple choice visual approach vs. descriptive natural language editing approach).

Figure 3:
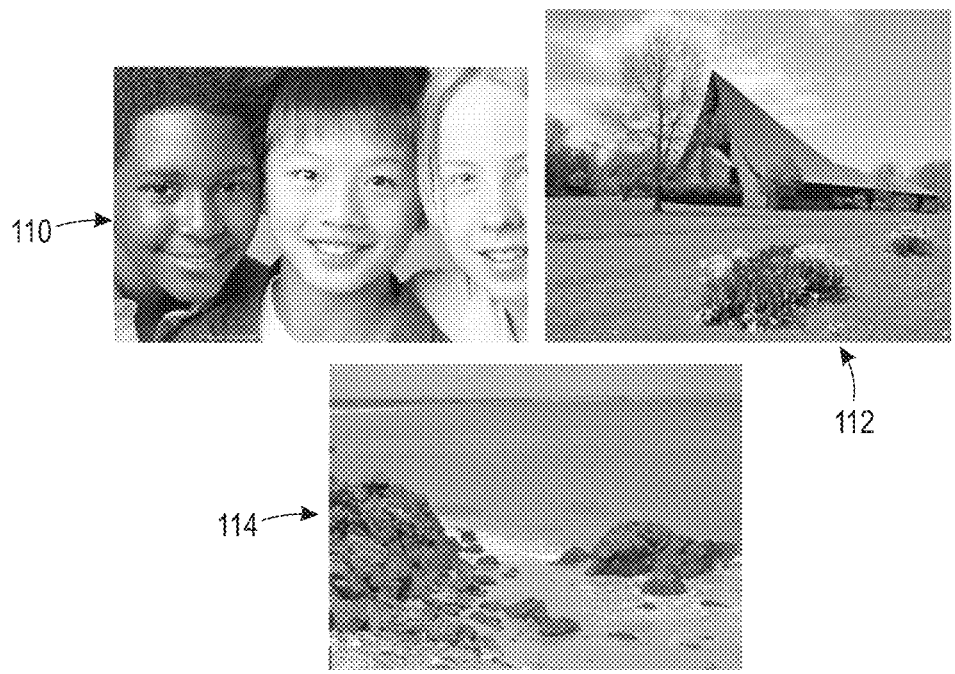
FIG. 3 presents images illustrating features of various systems and methods herein.

In item 104, the systems and methods herein conduct a color rendition preference survey using a set of probe images. In this step, the systems and methods herein utilize a set of probe images such as 110, 112, 114 and a simple online survey approach to collect customer preference on color rendition. Example probe images 110, 112, 114 are shown in FIG. 3, where skin tone (image 110), sky and grass (image 112), ocean scene (image 114) are used to identify the customer's rendition preference.

In one example, the set of probe images is fixed for all customers and all jobs. Such a fixed set covers typical skin tones and typical outdoor memory colors (see FIG. 3) and may include human portraits, sky, grass, foliage, ocean and river scenes etc (these classes of objects may be referred to as image categories or attributes). In another example, only a subset of a fixed database of probe images is used based on analyses of the images that were uploaded by the customer for a particular job (for example, only ocean scenes). In yet another example, the probe images are generated (via image retrieval and query of a large image database) based on analyses of the images that were uploaded by the customer for a particular job. In yet another example, the probe images are simply a subset of the customer's images, automatically chosen to be representative of the full set of images by analysis of the image content. In yet another example, if the total number of images uploaded by the user is small (say <5), lower resolution versions of all customer images are used as probe images directly. Each probe image should contain at least one of the image categories, such as mentioned above. That is, it can contain more than one image category. For example, 110 contains only human portraits while 112 contain both sky and grass. If a plurality of image categories is contained in each probe image, fewer probe images are needed to cover all image categories of interest. On the other hand, multiple probe images may be used to cover a single image category for robustly extracting customer's CR preference. In such cases, statistical values (e.g., averages) of the survey results for a given image category will be used.

The reason that the systems and methods herein should have multiple (but as few as possible) probe images is that the systems and methods herein desire to collect preferred renditions on those critical categories that are essential to the quality of pictorial images such as skin tone, grass, water (beach or river), sand etc. The preference can be different for each category for each individual. For example, some customers prefer lighter and whiter rendering of skin tones than do others. Some customers like blue skies that are slightly green-shade, while others like slightly red-shade skies. But the systems and methods herein do not need to have images of a large number of different views of sky or faces to determine one person's preference. This justifies the use of a small but representative set of probe images for such a task.

Figure 4:
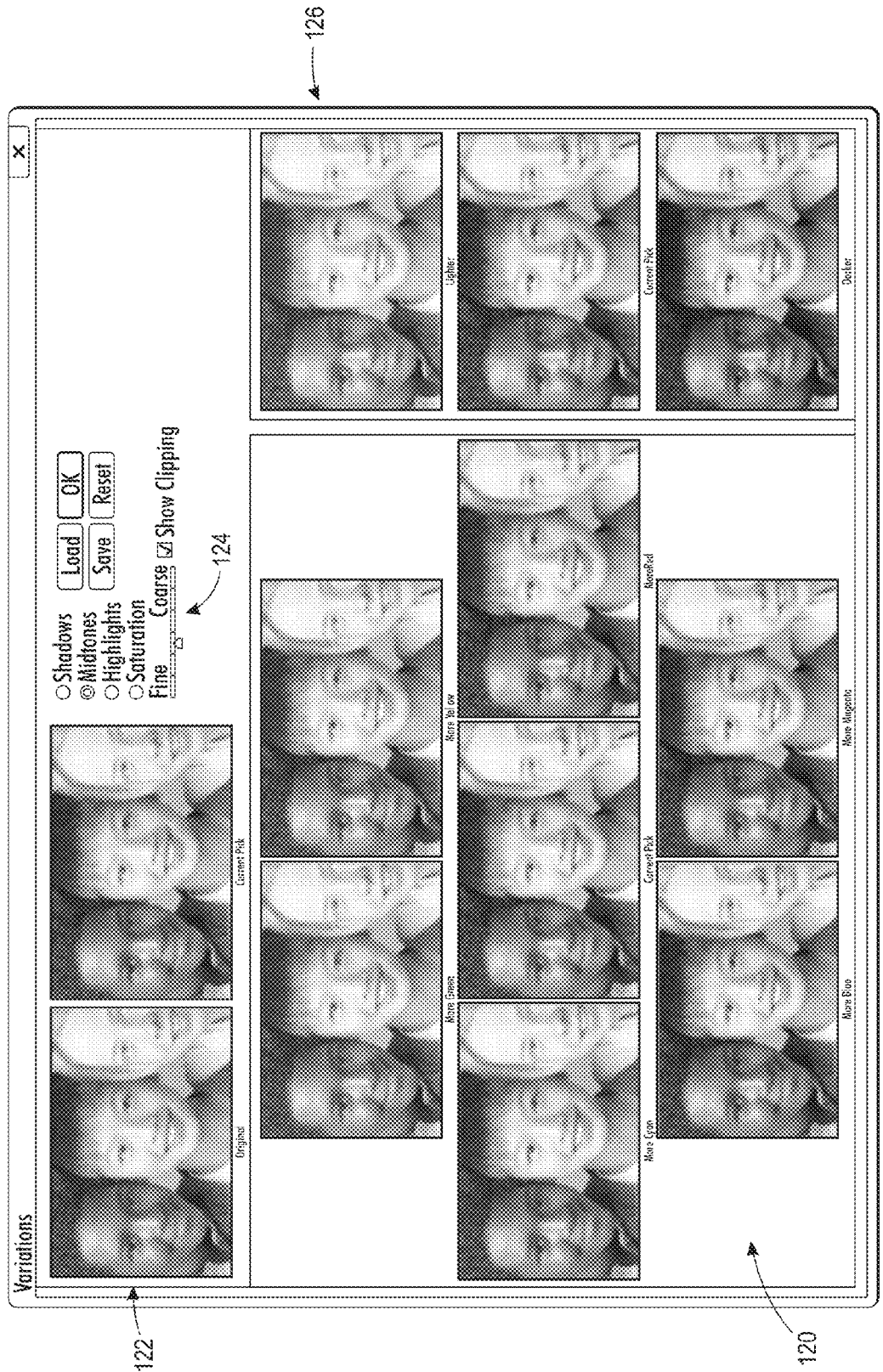
FIG. 4 is a screen shot illustrating features of various systems and methods herein.

For a color rendition survey, one method herein presents a single trial "ring-around" of multiple choices for each probe image, as shown in FIG. 4. More specifically, the ring of images 120 includes a current selection at the center, with images showing more green, more yellow, more red, more magenta, more blue, more cyan, etc., surrounding the current pick. Alternatively the ring-around may contain variations in terms of color parameters, such as positive and negative shifts in L*, a* and b*. This allows users to select the preferred color direction for each type of probe image, simply by clicking on one of the choices in the ring 120. The ring-around approach can be iterative, to get successively finer increments in the chosen parameters, or to more specifically focus the user's preferences or to obtain other preferences (e.g., contrast) using successive rings of images. The graphic user interface can also display the original image next to the current selection (shown by item 122) and can show the current selection against lighter and darker versions as shown by item 126. Providing such a graphic user interface selection to the user allows the user to change the colorization of the probe image in a matter of seconds.

Those ordinarily skilled in the art would understand that the graphic user interface screenshots provided in FIGS. 3-4 are merely examples and that the methods and systems herein could use any form of presentation to allow the user to alter the appearance of the original image. Therefore, while a well-known ring-around approach is discussed above, any other image comparison approaches (whether currently known or developed in the future) can be used with the systems and methods herein. For example, different features can be included to allow the customer some additional simple adjustments (e.g., a sliding bar 124 for magnitude of change, in the upper right corner of FIG. 3) for more accurate capture of rendition preference.

Figure 5:
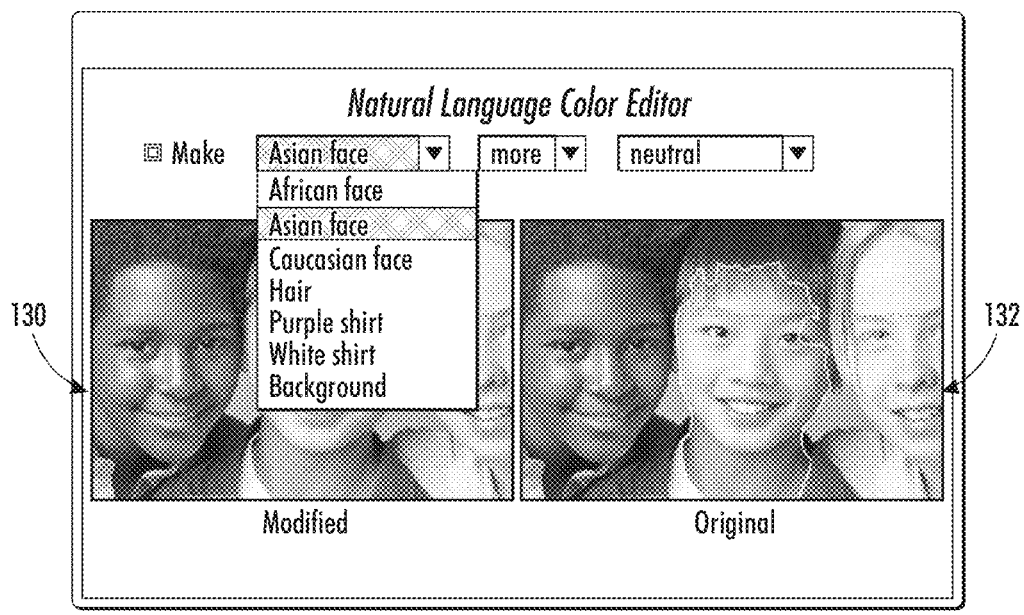
FIG. 5 is a screen shot illustrating features of various systems and methods herein.

Another example of the graphic user interface that could be used with systems and methods herein is a natural language color editor (NLCE, see U.S. Patent Publication 2008/0007749) such as that shown in FIG. 5. Note that, with the exception of using customer images directly as probe images, the systems and methods herein can pre-process (manually or automatically) the database of probe images with segmentation and with semantic labels. With that, the natural language color editor can be greatly simplified with a few pre-populated field selections. Using the image 110 shown in FIG. 3 as an example, the natural language semantic labeled regions of the image relating to the pre-populated field selections may include African face (left), Asian face (center), Caucasian face (right), Hair, Purple shirt, White shirt, Background regions. An example of a simplified pull-down field for NLCE is shown in FIG. 5 where the left pull-down menu selects the Race 2 from image 132, which is then highlighted or outlined in image 130. When the other pull-down menus (pull-down menu to the right showing a "neutral" menu selection) are selected, for example, the appearance of the center face in the image can be changed accordingly and shown modified in image 130.

With such systems and methods, the number of probe images presented to the user during the survey can be much smaller than the total number of customer images (e.g., photo book or simply family photos) of the customer job. Thus, the survey that extracts the subjective CR preference is very simple, short, and relevant, which is useful since customers will be unwilling to spend a lot of time or effort on the survey.

The methods and systems herein incorporate the extracted CR preference parameters into a job-specific color rendition profile as mentioned above in item 106. To incorporate the extracted CR preference parameters into a job-specific color rendition profile, the methods and systems herein consider the data collected from the preference survey. In the case of the exemplary ring-around approach presented above, the adjustment is made according to the preferred color direction selected by the user (and magnitude if a GUI like that in FIGS. 3 and 4 is used) for each category of memory colors (skin tone, sky, grass, ocean/river, sand etc.). With the preferred color direction and magnitude for each category, the methods and systems herein refine a generic profile (that may have been based on the preferences of a large population) to an individualized profile matching the specific customer's subjective preferences.

Again, in item 108, the methods and systems herein can print this custom job with the resulting profile. Here, the systems and methods herein use the resulting preferred profile to render a custom print job, which provides preferred color rendition compared to a generic profile. Additionally, the preference data can be stored in a database and can be used for future printing for the same customer in various ways. For example, data from previous surveys can be used to speed up or eliminate the survey for the next purchase by that customer. With previous survey information, preferences are previously known and can be used as the initial state of the survey. Further, historical analyses can be used to smooth out the preference parameters over time (noise filtering due to survey variability), etc.

FIG. 6 is flowchart illustrating an exemplary method herein. In item 150, this method receives an image-processing request relating to user images from a user into a graphic user interface of a computerized device. Such images can be any form of visual item, whether currently known or developed in the future, that can be output from a digital device (via graphic user interface, printer, input/output port, etc.). Therefore, for example, such "images" can be photographs, hand drawings/paintings, computer generated graphics, presentations, documents, screenshots, video, etc.

This method can classify the user images into image-element categories using a processor of the computerized device in item 152. The computerized device can also automatically obtain or select sample images that correspond to such image-element categories in item 154. The sample images can be taken from the images within the image-processing request (or a subset thereof), or can be standardized images that are different from the user images. Each of the sample images can represent at least one different image-element category. The processing in item 154 also can limit the sample images to only the image-element categories of the user images presented in the image-processing request.

When selecting a set of sample images, the user images can be classified based on image-element categories contained therein. In addition, when using a subset of the user images, each of the sample images represents at least one image-element category of the image-element categories.

Thus, as discussed above, FIG. 3 illustrates sample images (that are sometimes referred to herein as probe images) a skin tone image 110; a sky and grass image 112; an ocean and beach image 114, that are used to identify the customer's image rendition preference. Each sample image can represent an entire category of images. Such image element rendition categories can include skin color, sky color, grass color, water color, rock color, beach color, etc. Thus, a single sample image could be used to obtain a user's image rendition preference for an entire category of image elements. Further, the systems and methods herein can obtain all image characteristics (whether currently known or developed in the future). Therefore, while obtaining image element color user preferences is mentioned in many examples herein, the systems and methods herein can similarly obtain image element user preferences for contrast, tint, gloss, lightness, shadowing, etc., in additional to color (and can obtain all preferences in a single survey session, depending upon how many versions of the sample images are presented to the user during the survey session).

By using a single sample image (or a few sample images) for each category of image elements, much information can gained about each category of image elements. For example, the number of images presented to the user in the survey can be less than 10%, less than 5%, less than 1% of the total number of user images presented in the image processing request. The number of sample images presented is related to how diverse the user images are. Thus, if the user images are not diverse (and are mostly of the same scene or the same subject) there will not be as many different image elements relative to very diverse images. Thus, the number of sample images presented to the user will be lower if the user images contain many of the same elements and, therefore, the user images fall into a small number of image element categories. This allows the systems and methods herein to dramatically limit the number of images that a user will review, making the process of obtaining user image rendition preferences faster and more user-friendly.

The more user-friendly the process is, the more likely it is that the user will complete the survey; and, once the survey is completed, the images that are output from the systems herein are more closely aligned with the user's individual preferences (as opposed to average user preferences) which increases user satisfaction. Therefore, through the process of having a small number of images represent one or more categories of image elements, individual user preferences can be more easily obtained, thereby making the output images more pleasing to the individual user, and increasing the overall user satisfaction.

To obtain such individual image rendition preferences, the methods herein present, to the user, different versions of the sample images through the graphic user interface in item 156. The presentation in item 156 can include providing side-by-side images, sliding scales to change image feature rendition, natural-language choices to change image feature rendition, etc., to allow the user to select from among the different versions of the sample images.

In some systems and methods, each of the different image-element categories can be represented by only one category-specific sample image, and different versions of each category-specific sample image are included in the sample images. Images can contain a single element (only water); but more commonly, images contain multiple image elements (e.g., image 112 in FIG. 3 includes the image elements of sky, clouds, building, grass, road, flowers, etc.). Thus, a single sample image can be used to represent one category of images or image elements. Alternatively, a single sample image can be used to represent multiple categories of images or image elements. Also, multiple images can be used to represent one or more categories of images or image elements.

Then, in item 158, this exemplary method requests the user to select preferred versions of the sample images from the different versions of the sample images, using the graphic user interface. In response, this method receives one or more user selections of preferred images, through the graphic user interface in item 160 (this can include receiving natural-language choices). Also, this process can be iterative, with each user selection providing different or more specific image rendition preferences, as indicated by the line returning to item 156 from item 160, in FIG. 6.

The user selection of preferred versions can be an iterative process, and the different versions of the sample images can be generated by varying the selected color rendition parameters according to preselected values or can be generated according to changes in color rendition parameters specified by the user. Such changes in color rendition parameters can be specified by the user using graphical user-interface controls and/or natural language processing. As shown, the multiple image-element categories can include human portraits, sky, grass, foliage, ocean and river scenes.

Further, this method determines user-specific preferences for each different image-element category based on the preferred images selected by the user, using the processor in item 162. The user-specific preferences are different for each user that selects the preferred images through the graphic user interface. Subsequently, this method can process the image-processing request using the processor in item 164. During the processing in item 164, this method alters the rendition of the user images according to the user-specific preferences for each the different image-element category. Such processing of the image-processing request in item 164 can include printing the user images, displaying the user images, etc., using the altered renditions of the images.

When altering the renditions of the user images according to the user-specific preferences, this processing in item 164 can modify the color rendition profile locally from original color values (e.g., lightness, chroma, and hue) of the image-element categories to the user-specific preferences via a smooth mapping process. The smooth mapping process can include, for example, a locally-weighted regression (LOESS model), a sigmoid function which changes values smoothly around pre-specified center values while leaving values away from the centers unchanged, etc.

The process shown in FIG. 6 is very user-friendly because it asks the user to review and comment on a small number of images relative to the number of images being processed and, thus, the process is more likely to be used by the consumer. This allows the systems and methods herein to process a large number of current (and potentially future) images in a way that matches an individual consumer's preferences (which may deviate substantially from the "average" consumer), thereby increasing user satisfaction when compared to systems that require a laborious image rendition input process, or compared to systems that simply use the "average" consumer preferences.

Thus, exemplary methods herein receive an image-processing request relating to user images from a user into a graphic user interface of a computerized device in item 150. Such methods classify the user images into user-request image-element categories using a processor of the computerized device in item 152. If the previously stored user-specific preferences for the user-request image-element categories are maintained in the non-volatile computer storage medium (172), such methods retrieve the previously stored user-specific preferences for the user-request image-element categories from a non-volatile computer storage medium (184) using the processor in item 178. However, when the previously stored user-specific preferences for the user-request image-element categories are not in (are absent from) the database, such methods perform a process to obtain additional user-specific preferences for the user-request image-element categories, using the graphic user interface in item 174.

The previously stored user-specific preferences may comprise those previously stored preference data, input by the user, or those previously stored preference data, input by a plurality of different users. Such previously stored user-specific preferences of different users can be classified into user-type classifications, and in item 172 the methods herein can match the user into one or more of such user-type classifications using, for example, collaborative filtering or other processes that identify similarities of taste between the user and the classifications of the different users. In such situations, the methods only retrieve the previously stored user-specific preferences that are within the user-type classification(s) to which the user has been matched in item 178. Such methods can then processes the image-processing request using the processor by altering renditions of the user images according to the previously stored user-specific preferences and/or the additional user-specific preferences in items 164, 190 and 192.

Figure 7:
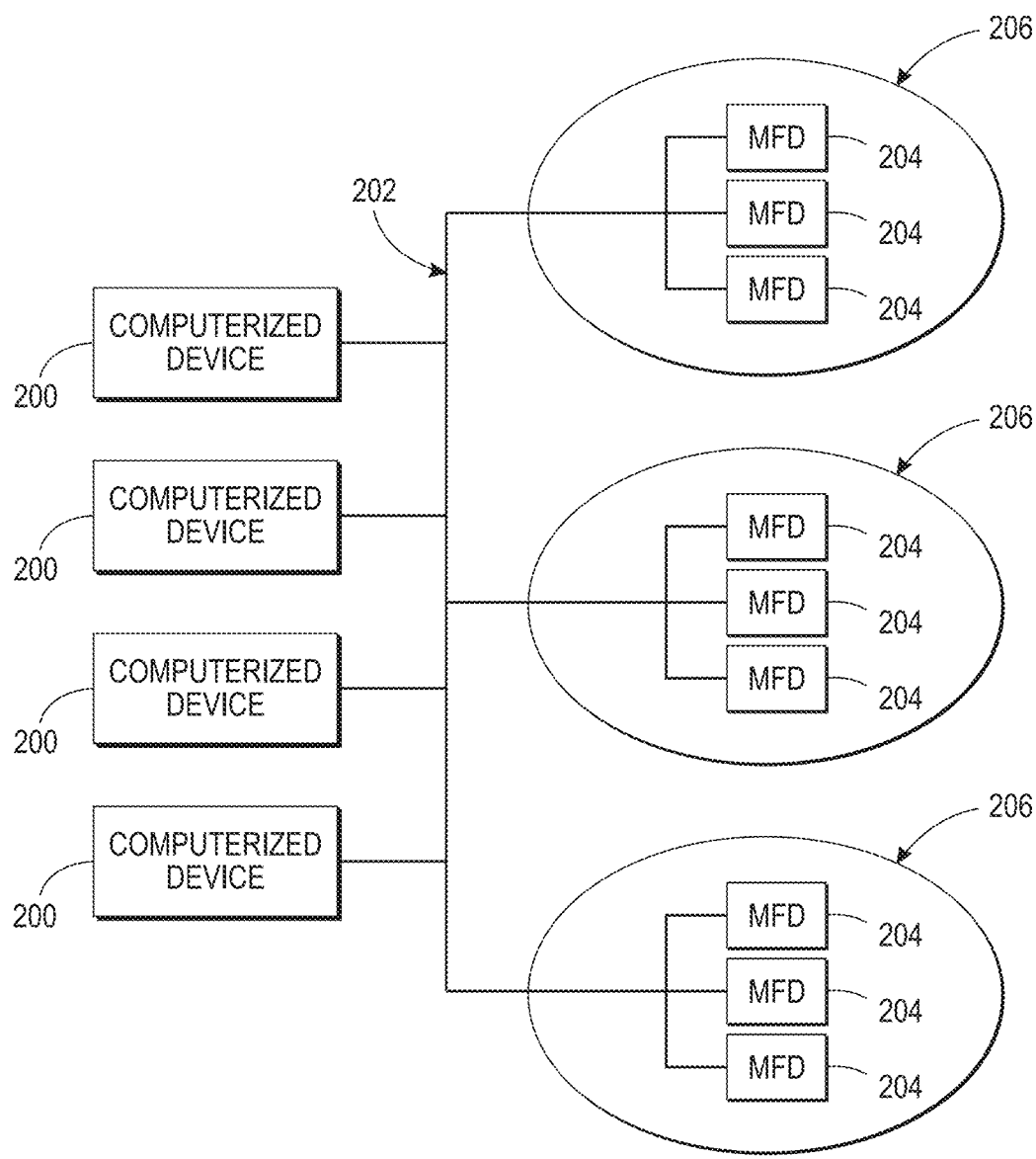
FIG. 7 is a schematic diagram of a system according to systems and methods herein.

As shown in FIG. 7, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 8:
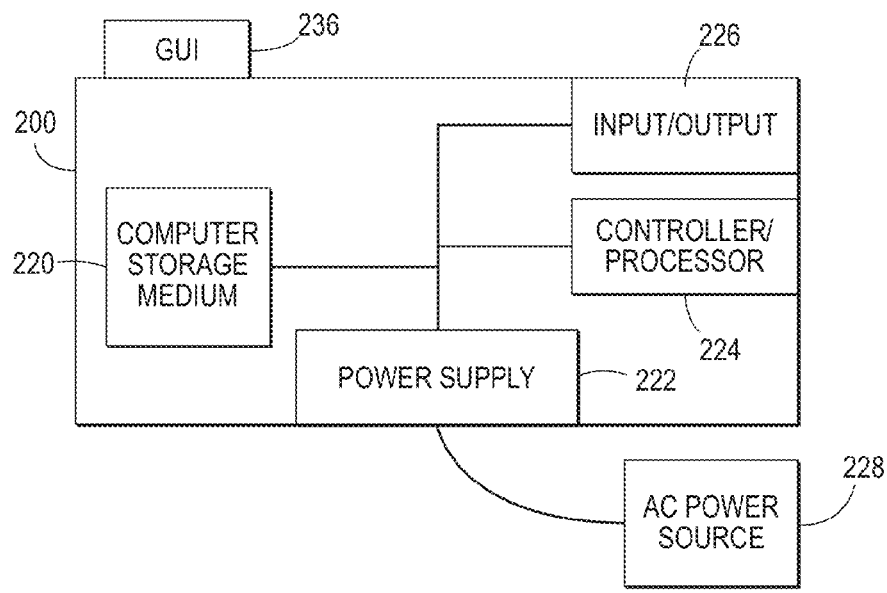
FIG. 8 is a side-view schematic diagram of a device according to systems and methods herein.

FIG. 8 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 8, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 9:
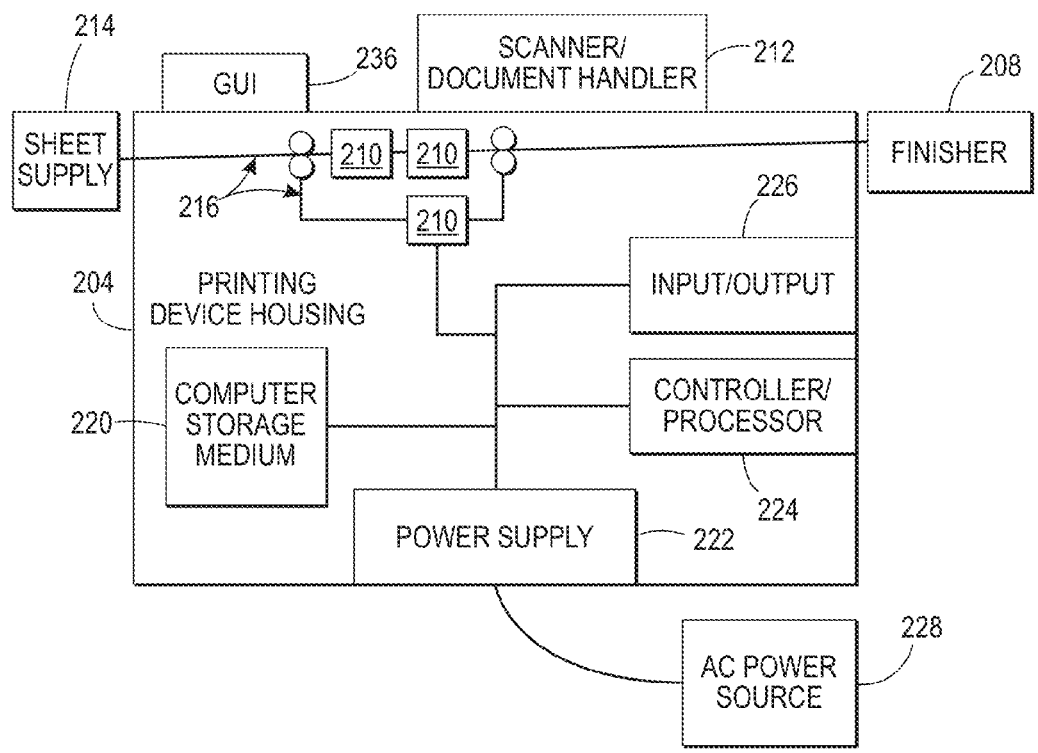
FIG. 9 is a side-view schematic diagram of a device according to systems and methods herein.

FIG. 9 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The systems and methods herein can encompass systems and methods that print in color, monochrome, or handle color or monochrome image data. All foregoing systems and methods are specifically applicable to inkjet, silver halide, electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving an image-processing request relating to user images from a user;
   classifying said user images into user-request image-element categories using a processor of a computerized device;
   retrieving previously stored user-specific preferences, from a non-volatile computer storage medium using said processor, that correspond to said user-request image-element categories into which said user images are classified, said previously stored user-specific preferences resulting from said user participating in a previous image rendition preference survey, and said previously stored user-specific preferences being previously stored preference data, input by a plurality of different users;
   obtaining additional user-specific preferences by having said user participate in additional image rendition surveys for ones of said user-request image-element categories for which corresponding previously stored user-specific preferences are absent from said non-volatile computer storage medium;
   deriving recommended renditions for said user images according to said previously stored user-specific preferences and/or said additional user-specific preferences retrieved based on said user-request image-element categories into which said user images are classified; and
   processing said image-processing request using said processor by altering renditions of said user images according to said recommended renditions.

2. The method according to claim 1, further comprising utilizing a recommender process to obtain estimated preferred renditions of said user images according to at least one of said previously stored user-specific preferences corresponding to said user-request image-element categories into which said user images are classified.

3. The method according to claim 2, said recommender process comprising at least one of:
   obtaining an average of preferred renditions of said user images from a subset of said previously stored user-specific preferences;
   obtaining a trend of preferred renditions of said user images from a subset of said previously stored user-specific preferences and predicting current preferred renditions of said user images; and
   obtaining estimated preferred renditions of said user images using collaborative filtering on a subset of the previously stored user-specific preferences.

4. The method according to claim 1, said retrieving previously stored user-specific preferences comprising identifying similarities of taste between said user and said different users using one of collaborative filtering and clustering methods.

5. A method comprising:
   receiving an image-processing request relating to user images from a user;
   classifying said user images into user-request image-element categories using a processor of a computerized device;
   retrieving previously stored user-specific preferences obtained from previous survey inputs of at least said user, from a non-volatile computer storage medium using said processor, that correspond to said user-request image-element categories into which said user images are classified, said previously stored user-specific preferences resulting from said user participating in a previous image rendition preference survey, and said previously stored user-specific preferences being previously stored preference data, input by a plurality of different users;
   obtaining additional user-specific preferences by having said user participate in additional image rendition surveys for ones of said user-request image-element categories for which corresponding previously stored user-specific preferences are absent from said non-volatile computer storage medium;
   deriving recommended renditions for said user images according to said previously stored user-specific preferences and/or said additional user-specific preferences retrieved based on said user-request image-element categories into which said user images are classified; and
   processing said image-processing request using said processor by altering renditions of said user images according to said recommended renditions.

6. The method according to claim 5, further comprising utilizing a recommender process to obtain estimated preferred renditions of said user images according to at least one of said previously stored user-specific preferences corresponding to said user-request image-element categories into which said user images are classified.

7. The method according to claim 6, said recommender process comprising at least one of:
   obtaining an average of preferred renditions of said user images from a subset of said previously stored user-specific preferences;
   obtaining a trend of preferred renditions of said user images from a subset of said previously stored user-specific preferences and predicting current preferred renditions of said user images; and
   obtaining estimated preferred renditions of said user images using collaborative filtering on a subset of the previously stored user-specific preferences.

8. The method according to claim 5, said retrieving previously stored user-specific preferences comprising identifying similarities of taste between said user and said different users using one of collaborative filtering and clustering methods.

9. A computerized device comprising:
   a processor;
   a non-volatile computer storage medium operatively connected to said processor; and
   a graphic user interface operatively connected to said processor,
   said graphic user interface receiving an image-processing request relating to user images from a user,
   said processor classifying said user images into user-request image-element categories,
   said processor retrieving previously stored user-specific preferences, from said non-volatile computer storage medium, that correspond to said user-request image-element categories into which said user images are classified, said previously stored user-specific preferences resulting from said user participating in a previous image rendition preference survey, and said previously stored user-specific preferences being previously stored preference data, input by a plurality of different users, said processor obtaining additional user-specific preferences by having said user participate in additional image rendition surveys for ones of said user-request image-element categories for which corresponding previously stored user-specific preferences are absent from said non-volatile computer storage medium, said processor deriving recommended renditions for said user images according to said previously stored user-specific preferences and/or said additional user-specific preferences retrieved based on said user-request image-element categories into which said user images are classified, and said processor processing said image-processing request by altering renditions of said user images according to said recommended renditions.

10. The computerized device according to claim 9, said processor utilizing a recommender process to obtain estimated preferred renditions of said user images according to at least one of said previously stored user-specific preferences corresponding to said user-request image-element categories into which said user images are classified.

11. The computerized device according to claim 10, said recommender process comprising at least one of:
    obtaining an average of preferred renditions of said user images from a subset of said previously stored user-specific preferences;
    obtaining a trend of preferred renditions of said user images from a subset of said previously stored user-specific preferences and predicting current preferred renditions of said user images; and
    obtaining estimated preferred renditions of said user images using collaborative filtering on a subset of the previously stored user-specific preferences.

12. The computerized device according to claim 9, said processor retrieving previously stored user-specific preferences by identifying similarities of taste between said user and said different users using one of collaborative filtering and clustering methods.

13. A non-transitory storage medium readable by a computerized device, said non-transitory computer storage medium storing instructions executable by said computerized device to cause said computerized device to perform a method comprising:
    receiving an image-processing request relating to user images from a user;
    classifying said user images into user-request image-element categories using a processor of a computerized device;
    retrieving previously stored user-specific preferences, from a non-volatile computer storage medium using said processor, that correspond to said user-request image-element categories into which said user images are classified, said previously stored user-specific preferences resulting from said user participating in a previous image rendition preference survey, and said previously stored user-specific preferences being previously stored preference data, input by a plurality of different users;
    obtaining additional user-specific preferences by having said user participate in additional image rendition surveys for ones of said user-request image-element categories for which corresponding previously stored user-specific preferences are absent from said non-volatile computer storage medium;
    deriving recommended renditions for said user images according to said previously stored user-specific preferences and/or said additional user-specific preferences retrieved based on said user-request image-element categories into which said user images are classified; and
    processing said image-processing request using said processor by altering renditions of said user images according to said recommended renditions.

14. The non-transitory storage medium according to claim 13, said method further comprising utilizing a recommender process to obtain estimated preferred renditions of said user images according to at least one of said previously stored user-specific preferences corresponding to said user-request image-element categories into which said user images are classified.

15. The non-transitory storage medium according to claim 14, said recommender process comprising at least one of:
    obtaining an average of preferred renditions of said user images from a subset of said previously stored user-specific preferences;
    obtaining a trend of preferred renditions of said user images from a subset of said previously stored user-specific preferences and predicting current preferred renditions of said user images; and
    obtaining estimated preferred renditions of said user images using collaborative filtering on a subset of the previously stored user-specific preferences.

16. The non-transitory storage medium according to claim 13, said retrieving previously stored user-specific preferences comprising identifying similarities of taste between said user and said different users using one of collaborative filtering and clustering non-transitory storage mediums.

* * * * *